United States Patent [19]

Petrimaux et al.

[11] Patent Number: 4,469,128
[45] Date of Patent: Sep. 4, 1984

[54] SYSTEM FOR DISTRIBUTING BY ELECTRICAL MEANS PNEUMATIC CONTROL SIGNALS

[75] Inventors: Eric Petrimaux, Evreux; Pierre Prudhomme, Saint Germain en Laye, both of France

[73] Assignee: La Telemecanique Electrique, France

[21] Appl. No.: 371,361

[22] Filed: Apr. 23, 1982

[30] Foreign Application Priority Data

Apr. 24, 1981 [FR] France .................................. 81 08230

[51] Int. Cl.³ .............................................. F15B 13/08
[52] U.S. Cl. ................................ 137/554; 137/596.17; 137/884; 339/15
[58] Field of Search ................... 137/269, 554, 596.17, 137/625.64, 625.65, 884; 339/15, 16 R, 19, 198 GA

[56] References Cited

U.S. PATENT DOCUMENTS

| | | | |
|---|---|---|---|
| 3,035,611 | 5/1962 | Collins | 339/16 R X |
| 3,265,352 | 8/1966 | Allen | 339/16 R X |
| 3,450,160 | 6/1969 | Tess | 137/625.64 |
| 3,513,876 | 5/1970 | Tarbox | 137/269 X |
| 4,093,329 | 6/1978 | Asbill | 339/16 R |
| 4,095,863 | 6/1978 | Hardin | 137/884 X |
| 4,095,864 | 6/1978 | Hardin | 137/884 X |
| 4,224,957 | 9/1980 | Darves et al. | 137/884 X |
| 4,308,891 | 1/1982 | Loup | 137/625.65 |
| 4,352,532 | 10/1982 | Hardin | 137/884 X |
| 4,415,004 | 11/1983 | Bouteille et al. | 137/884 |

Primary Examiner—Gerald A. Michalsky
Attorney, Agent, or Firm—William A. Drucker

[57] ABSTRACT

A system is provided using a multiplicity of coupled modules (43) each module comprising a removable electro-magnetic valve (53) provided with terminals (73, 74) and a base (52) having coupling members (106, 107) which cooperate with the terminals, and connecting pieces (104, 123) for supplying the coil (55). This system is applicable in particular in industrial installations where electrical detectors control pneumatic apparatus.

5 Claims, 16 Drawing Figures

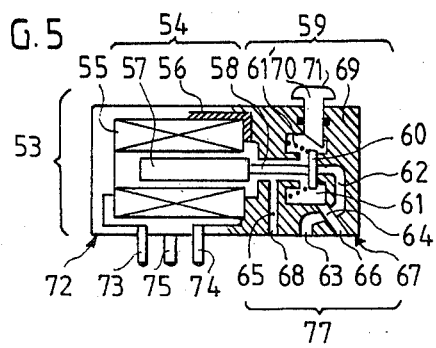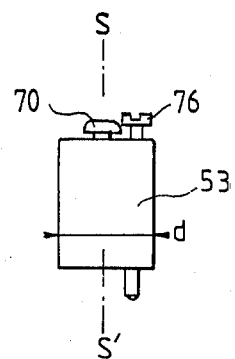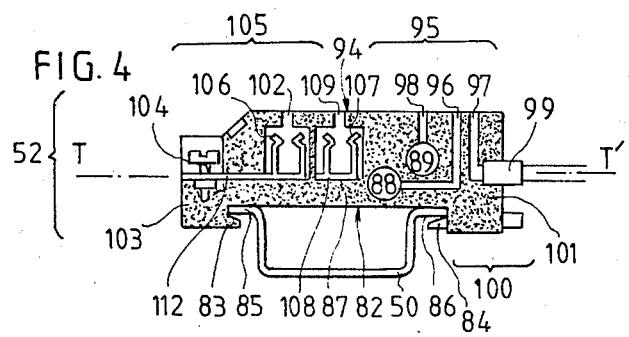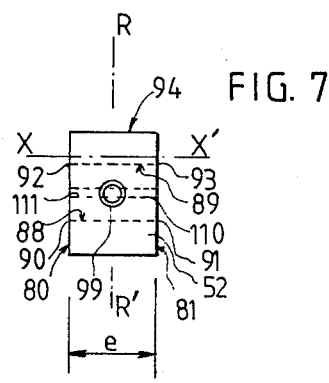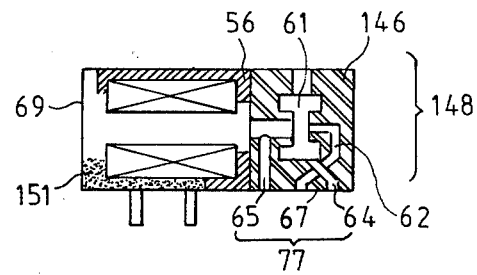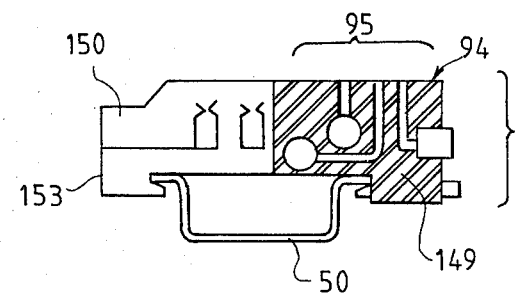

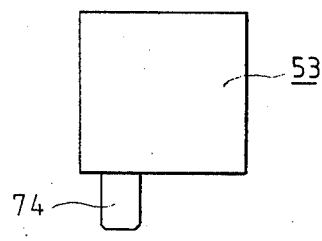
FIG. 9
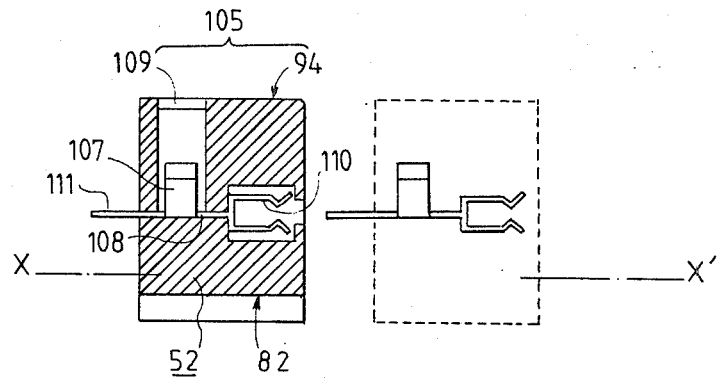
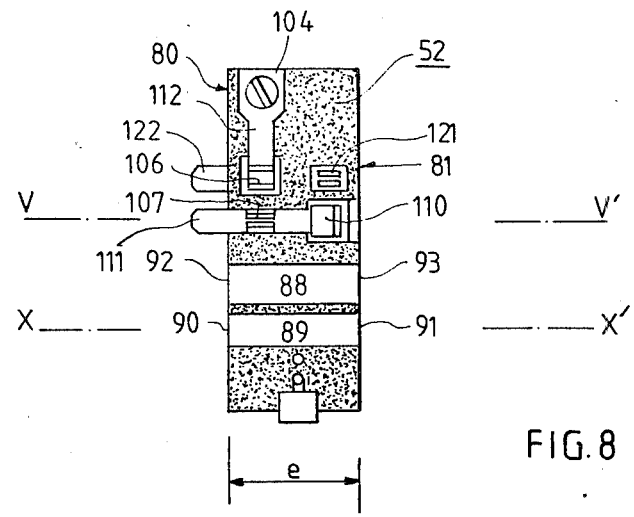
FIG. 8

SYSTEM FOR DISTRIBUTING BY ELECTRICAL MEANS PNEUMATIC CONTROL SIGNALS

BACKGROUND OF THE INVENTION

The invention relates to a system for distributing pneumatic signals by electric means comprising:

on the one hand, a multiplicity of bases put together by their opposite parallel lateral faces and in a longitudinal direction in which each base comprises: at least one longitudinal pressurized fluid supply channel portion which extends between lateral coupling faces and which is connected to the corresponding channel portions of the adjacent bases, an association surface having at least two orifices connected respectively to the channel portion and to at least one pneumatic outlet connection placed in a zone of the base for supplying a user apparatus, and a fixing surface opposite the association surface, and comprising, on the other hand, a multiplicity of electro-magnetic valves each comprising a control electro-magnet having a coil with two electrical connection terminals, mobile armature and a valve which is actuated by this armature for connecting an outlet opening, either to a pressure aperture, or to an exhaust aperture, in which at least these two first apertures are placed in a cooperating surface of the electro-magnetic valve, these bases being fixed to a support by securing means, and these electro-magnetic valves being respectively associated with these pieces through association means so that the apertures cooperate with the orifices.

THE PRIOR ART

Compressed air power distribution devices are already known whose general construction corresponds to what has just been described. These systems are generally used for supplying, through pneumatic distributors, large amounts of fluid to user means, such as jacks. In these systems, electro-magnetic valves control directly or indirectly valving means moving in large sized bores.

Their dimensions are consequently very large and use thereof further requires that the system be placed in the immediate neighborhood of the apparatus which they are intended to supply so as to reduce pressure losses.

The result is that the environment in which the electric members of the electro-magnetic valve are placed is rarely compatible with the one it would be desirable to reserve for them and that, more especially, the routing of electric conductors poses a delicate ducting, protection and identification problem which is further aggravated when repairs or adjustments are undertaken which often require the intervention of persons having different professional qualifications.

In addition, it is generally not possible, in these known installations, to provide any electric combination whatsoever of the control signals; thus, the simple attempt to place two electro-magnetic valves locally in parallel so as to provide simultaneous control is impossible because, for example, the coil terminals of these electro-magnetic valves are supplied by electric cables passing through glands which forbids any interconnection.

The control of these electro-magnetic valves within the framework of a control logic equation can just be obtained either by using electric connection boxes locally, and in this case we find again the disadvantages due to the environment, or else using systematically for each electro-magnetic valve (and there are often two for each distributor) two conductors which must be extended to a control cabinet in which the control signals and orders are elaborated and combined.

When the application limits of "all pneumatic" automatic devices are reached, for example when extremely extensive or complex installations are to be controlled, or when it is a question of installations in which the electric or electronic sensors are irreplacable, or further when the complexity of the control logic requires use to be made of the resources of electronics, "electronic-pneumatic" automatic control hybrid systems must be used, for the previously known and described systems do not allow the problem set to be answered because of the incompatibility of the functions which they must provide. Furthermore, the replacement of a defective electro-magnetic valve requires dismantling and disconnecting which are very time-wasting.

Electro-pneumatic distribution systems are further known adapted to the distribution of symbols or to the direct control of small jacks in which a multiplicity of associable bases each provided with through channel portions and a pneumatic control outlet are arranged so as to receive, each one, an electro-magnetic valve fixed removable thereon; these electro-magnetic valves which each contain an electro-magnet and valve generally have terminals adapted for receiving a removal connector.

If the waste of time, with which the preceding system may be reproached, is in this case substantially reduced when a defective electro-magnetic valve must be changed, the disadvantages relative to the impossibility of effecting interconnections remain the same. Furthermore, the time taken for wiring the connectors as well as their price, make them excessive in view of the cost of the other elements of the system whereas reliability may suffer of carried-out operations during which the conductors ending at the connectors must be moved.

OBJECT OF THE INVENTION

The invention proposes providing automatic electro-pneumatic control means adapted to be used in a distribution system when the situations which have just been mentioned appear, and to give to these means not only an homogeneity which will protect them from the constraints due to the environment but also to give them reduced dimensions which will allow them to be incorporated in cabinets traditionally reserved for electric and electronic equipment, while providing electrical connection thereof on particularly favorable conditions of cost, flexability and reliability.

SUMMARY OF THE INVENTION

According to the invention this result is obtained because the association surface comprises a first region receiving the orifices and a second region adjacent to the first one having connecting members adapted to cooperate directly with the opening terminals of the coil when the electro-magnetic valve is associated with the base, and because the latter has in a first zone, opposite the second zone receiving the pneumatic openings, at least one electrical connection piece which is in permanent electrical connection with the first opening member and which is adapted to receive at least one external individual electrical conductor in which appear electrical control signals, whereas the second coupling member is connected electrically to a conducting piece, to which is applied a permanent voltage, this piece being arranged so as to be connected directly or indirectly to at least one second similar conducting piece belonging to a separate base so as to communicate thereto the said permanent voltage.

BRIEF DESCRIPTION OF THE DRAWINGS

Other features and associated aims of the invention will better appear from the following description, which describes one embodiment accompanied by variations given way of example.

In the accompanying drawings:

FIG. 4 shows a sectional view of a module base through a plane RR' perpendicular to the axis XX';

FIG. 5 shows a sectional view through a modular electro-magnetic valve through a plane SS' perpendicular to the axis XX';

FIG. 6 shows a side view of an electro-magnetic valve;

FIG. 7 illustrates a side view of a base;

FIG. 8 shows a top view of the base through a plane TT' parallel to a lower securing face, of a base, in accordance with a first method of electrical coupling.

FIG. 9 shows a section of the base through the plane VV' defined in FIG. 8 and in a side view;

FIGS. 14a and 14b illustrate one embodiment of an electro-magnetic valve and of a modular base promoting discharge of the heat released in the coil.

DESCRIPTION OF PRIOR ART

Figure 1A:
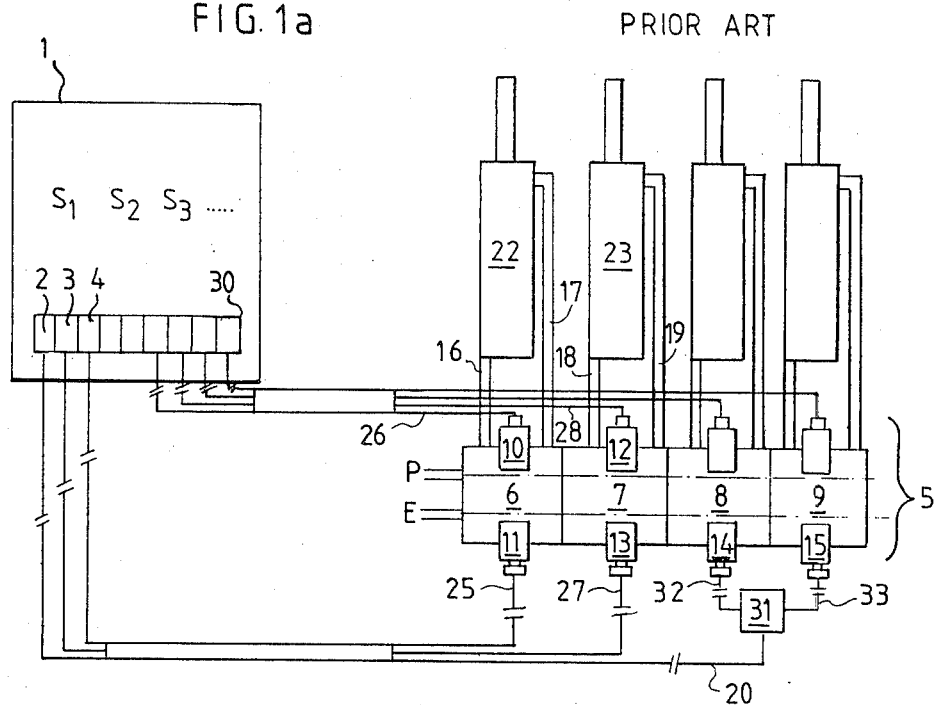
FIGS. 1a and 1b show, schematically, two electro-pneumatic installations according to the prior art.

In FIG. 1a, which illustrates schematically a known prior art system, a control cabinet 1 elaborates electrical control signals $S_1$, $S_2$, $S_3$, which appear in an electrical terminal strip 30 comprising as many pairs of terminals 2, 3, 4 . . . as there are signals to be supplied.

The pneumatic power installation 5 comprises a multiplicity of distributors 6, 7, 8, 9 . . . , which are associated against each other and in communication with a through duct P supplying pressurized power fluid, and generally a through channel for collected discharge E.

Each distributor has a distribution base to each of which are fixed at least one and generally two electro-magnetic valves such as 10, 11 respectively 12, 13 respectively 14, 15 etc . . . , and with which are associated pipings such as 16, 17, 18, 19 which terminate respectively at jacks 22, 23, etc . . . .

Electric cables such as 25-26, 27-28 etc . . . each comprising two conductors, terminate at each pair of electro-magnetic valves serving a base so as to transmit thereto corresponding electrical signals.

In the righthand region of the figure, a local connection box 31 has been used so as to provide, for example, simultaneous energization of the two electro-magnetic valves 10 and 11 through a cable 20 and so as to avoid extending their supply cables 32, 33 as far as cabinet 1; thus can be seen directly the disadvantages mentioned above.

Figure 1B:
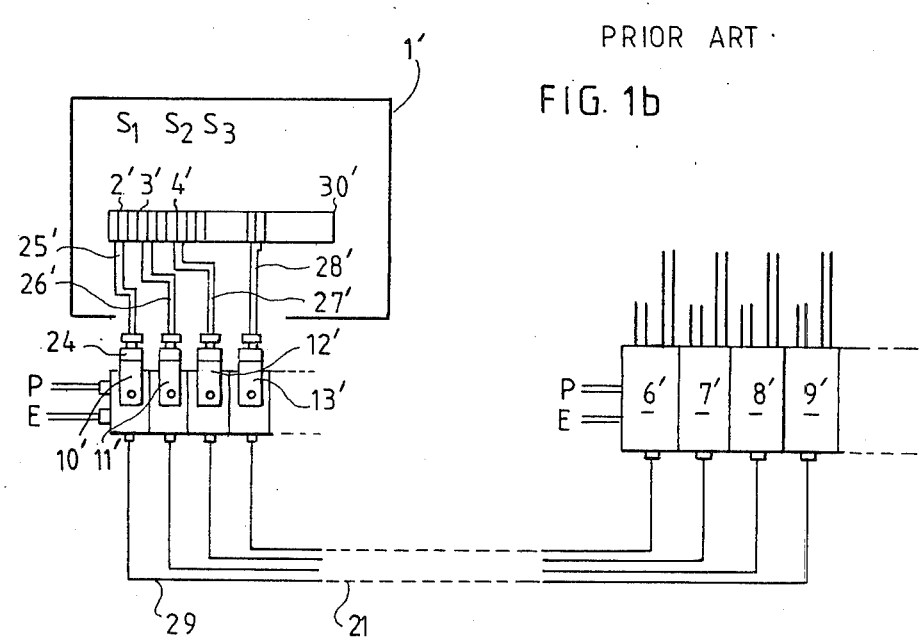

In FIG. 1b, a second known system has been shown and the parts having comparable functions bear references of the same rank.

In a box 1' where electric control means are grouped together, there is disposed a terminal strip 30' comprising terminal pairs 2', 3', 4' intended to be connected to conductor pairs 25', 26', 27', 28'.

These conductors supply respectively electro-magnetic valves 10', 11', 12', 13' which are fixed to associable bases 34, 35, 36, 37. Each electro-magnetic valve is coupled to the corresponding conductors by means of plug-in connectors such as 24.

Finally a bundle 21 of flexible tubes 29 leads pneumatic control outputs to an installation 5' comprising power distributors 6', 7', 8', 9'.

The scope of the remarks made with respect to cabling difficulties may thus be judged in the light and on examination of this type of system.

DESCRIPTION OF THE PREFERRED EMBODIMENT

Figure 2:
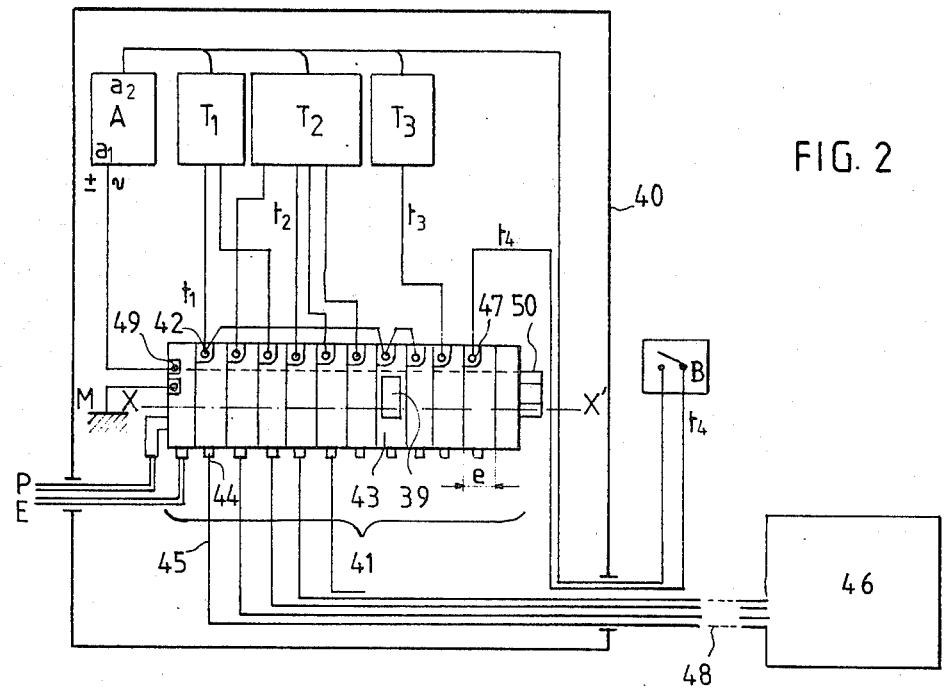
FIG. 2 shows schematically an electro-pneumatic installation using the system of the invention.

In FIG. 2 which shows schematically an industrial installation using an pneumatic control signal distribution system in accordance with the invention, a control cabinet 40 elaborates by electric or electronic means $T_1$, $T_2$, $T_3$, electric control signals $t_1$, $t_2$, $t_3$ which are applied to the input terminals 42 of an array 41 of modular electro-pneumatic bars 43 associated with each other and fixed to a standardized section 50 in the manner of terminals of an electrical strip. An external signal $t_4$, supplied for example by an electric position sensor or switch B, may also be applied directly to an input 47. Each of these electro-pneumatic bars or modules has a thickness e, measured in the longitudinal direction XX' in which they are assembled, which is small and reaches for example a dimension of the order of 17.5 mm corresponding to a dimension frequently used in electro-techniques.

Besides these input terminals 42 which have just been mentioned, each module further comprises a pneumatic connection of relatively small section 44 which is connected to a flexible tube 45 extending outside the cabinet so as to supply pneumatic output signals to a pneumatic power installation 46 whose distributors are controlled pneumatically; these distributors will be of the monostable or bistable type.

Furthermore, a pressurized air source P common to the modules as well as an exhaust duct E terminate, by through channels parallel to XX', at each module to supply it with fluid and to exhaust respectively the one which is no longer operative. An internal electrical supply A having two poles or phases $a_1$, $a_2$, supplies, on the one hand, directly the assembly of modules at 49 and, on the other hand, the input terminals 42 after appropriate logic processing.

If need be, this supply may also supply the external sensor B. It can thus be seen that all the components of the system having an electrical nature and functions is grouped together inside the same case, and that only pneumatic output signals which are homogeneous with the nature of the pneumatic power installation for which they are intended, thus requiring personnel having one and the same qualification for maintenance thereof, flow in a bundle of flexible tubes 48 towards the pneumatic installation 46.

It should also be noted that elaboration and modification of a logic equation to which the pneumatic power installation will have to comply, may be effected very easily within the cabinet and through conventional electrical interconnection means.

Each electro-pneumatic module 43 comprises, as will be described herebelow, a fixed base on which will be placed the input terminal 42 and a removal electro-magnetic valve 39 which has terminals adapted to be plugged into the base to be there fixed and electrically coupled.

An element or module 43 of the pneumatic distribution system 41 whose function has just been discussed above, can be better seen in FIG. 3, in which a standard metal section 50, fixed in the cabinet and of the type having two parallel flanges at the same level whose edges are spaced apart by 35 mm, such as currently used in electro-techniques, serves as a support for a multiplicity of electro-pneumatic distribution modules such as 51, 51', 51'' . . . , which are joined together side by side.

Each module comprises principally, as can be seen in FIGS. 4 to 7, a base 52 and an electro-magnetic valve 53. This latter comprises, in a way known per se, an electro-magnet 54 having a coil 55, preferably a yoke 56 for flux return, a movable armature or a mobile plunger core such as 57, and a transmission rod 58 which communicates the movements of the core to a valve 59.

This valve, which may take on different forms depending on the characteristics which will be required of it, has been illustrated in a simplified non-limiting form comprising a flap 60 movable in a chamber 61 and closing, under the action of a return spring 61', one end of a pressure duct 62 which will be supplied permanently with pressure through a pressure opening 63 placed at its other end.

Two other ducts 64 and 65 open into the chamber and are connected together by this latter when, in the unenergized condition of the electro-magnet, the valve closes the pressure duct 62, whereas when the valve is moved leftwards by the plunger core, the pressure duct 62 is connected by chamber 61 to duct 64, which forms the outlet duct, one opening 66 of which is opposite the chamber; in this operating state of the valve corresponding to an energized condition of the electro-magnet, duct 65, which is an exhaust duct, is closed by the flap.

The two openings 63 and 66 are necessarily placed in the same flat external surface 67 of the body 69 of the electro-magnet valve, which will be a cooperating surface, whereas opening 68 which is at the end of the exhaust duct 65 opposite chamber 61 may be either in the surface 67 or in another external surface.

A push rod 70, shown schematically, may be placed in body 69 of the electro-magnetic valve and extend into chamber 61 so as to cause movement of the flap, independently of the plunger core, when its external end 71 is subjected to a manual action F; the face on which end 71 is placed will be preferably opposite surface 67.

This surface 67 is substantially extended by a second surface 72 which has at least two electrically insulated terminals 73, 74 connected respectively to the two ends of the winding of coil 55; these two terminals may be possibly accompanied by a third terminal 75 which will in this case be connected to a metal part of the electro-magnetic valve, serving as ground. This electro-magnetic valve forms a removable sub-assembly having a small width d, see FIG. 6, and may be associated with the base, described below, for example by means of screw 76 placed preferably in a region 77 of the body receiving the flap, the chamber and the push rod.

The preceding removable sub-assembly 53 has been entrusted with the active functions of the module, whereas the base 52 provides the passive functions of electrical coupling and pneumatic transmission.

This base 52, see FIGS. 4, 7 and 8, has two lateral opposite parallel bases which form faces 80, 81 coupling with the similar faces of the adjacent bases, and which are separated by distance e substantially equal to 17.5 mm.

A lower face, or securing surface 82, has securing means such as a notch 83 and resilient hook 84 which adapt it for fixing on the parallel and opposite flanges 85, 86 of the standard section 50.

Channel portions 88 and 89 through which will flow pressurized supply fluids P and exhaust fluids E, pass through body 5 of the base, parallel to the longitudinal axis XX', from one side to the other and open at their opposite ends 90, 91 and 92, 93 in the lateral coupling faces 80, 81.

A flat association surface 94, opposite the securing face 82 and substantially parallel thereto, has a first region 95 with a first orifice 96 connected to channel portion 88 and a second orifice 97 connected by a conduit to a pneumatic connection 99 itself placed in a particular zone 100 of the base, which is not placed on the association surface, and is placed, in the example illustrated, at one end 101 of the base perpendicular to the surface 94.

If need be, that is to say if the electro-magnetic valve has an exhaust aperture 68 in its face 67, a third orifice 98 connected at 89 is provided in the association surface 94 and in the same zone 95 as the other two. In another zone 103, opposite zone 100, which is adjacent to region 95, is placed at least one electrical connection piece such as 104, whereas in a second region 105 of surface 94, between 95 and 103, are placed at least two windows 102, 109 providing access for two coupling members 106, 107 which are situated inside body 87 of the base and which are adapted to cooperate removably, that is to say by plugging, by pressure or by similar processes, with terminals such as terminals 73, 74 of the electro-magnetic valve.

In the embodiment illustrated in FIGS. 8 and 9, an electricity-conducting-through piece 108 is placed inside body 87 of the base and extends parallel to the longitudinal axis XX' between the lateral faces where it terminates in removable electrical couplings means 110, 111, which are, for example, similar to plugs and sockets or which have in any case the same properties.

The coupling members 106, 107 are electrically and respectively connected, on the one hand, to the electrical connection piece 104 through 112 and, on the other hand, to the through piece 108, see also FIG. 4.

When a multiplicity of bases is coupled by the lateral coupling faces of each of them, the channel portions 88 and 89 are pneumatically coupled sealing them together, and the through pieces 108 are connected electrically to each other to form a current distribution means common to all the bases.

Figure 3:
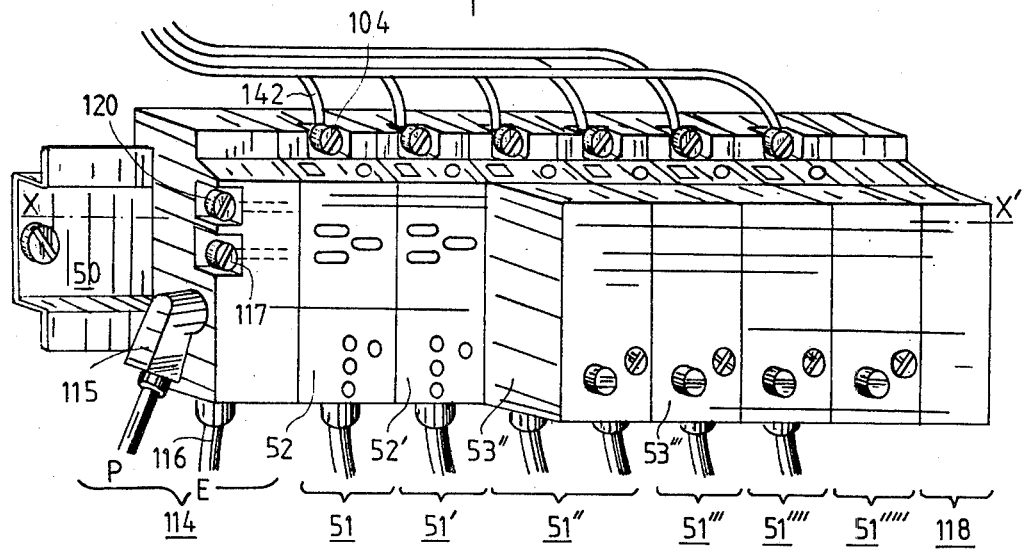
FIG. 3 shows, in a perspective view, an electro-pneumatic distribution system formed by the association of several electro-pneumatic modules, along a longitudinal axis XX' in the first two of which the electro-magnetic valve has been removed.

An initial junction block such as 114, shown in FIG. 3, comprises pressurized fluids supply means 115 and exhaust means 116 representing a common exhaust outlet; this junction block provides the pneumatic coupling connection (by means of internal channels not shown a pneumatic coupling with the channel portions of base 52), which helps, if required, in maintaining the bases on the section to which it itself is fixed.

Furthermore, this junction block comprises at least one electrical termination 117 which, through internal conductors not shown in the figure, is associated with one of the electric coupling means such as 111 placed at one end of the through piece 108 which is disposed in the body of base 52.

An end junction block such as 118 is placed to the end of the stack of bases opposite the initial block, to contribute in securing the bases, protecting the last through piece of the external electrical contact and closing the ducts P and E.

Coupling members 106, 107 placed in the first region 105 and the orifices 96, 97, 98 placed in the second region 95 of base 52, are arranged on the association face 94 so that terminals 73, 74 and aperture 63, 66, 68 of the electro-magnetic valve 53 may cooperate with these members and these orifices when the cooperating surface 67 of the electro-magnetic valve is associated with the association surface 94 of the base and held thereon by securing screw 76.

When a ground terminal 75 is provided on an electro-magnetic valve, a corresponding coupling member 121 is provided in the base, a second electrical through piece 122 parallel to XX' and similar to piece 108, 110, 111, being connected thereto form with the corresponding piece of the other bases a common ground conductor (see FIG. 8).

Junction block 114 has, in this case, an additional electrical termination 120 for general and common grounding of the electro-magnetic valves (see FIG. 3).

Figure 10:
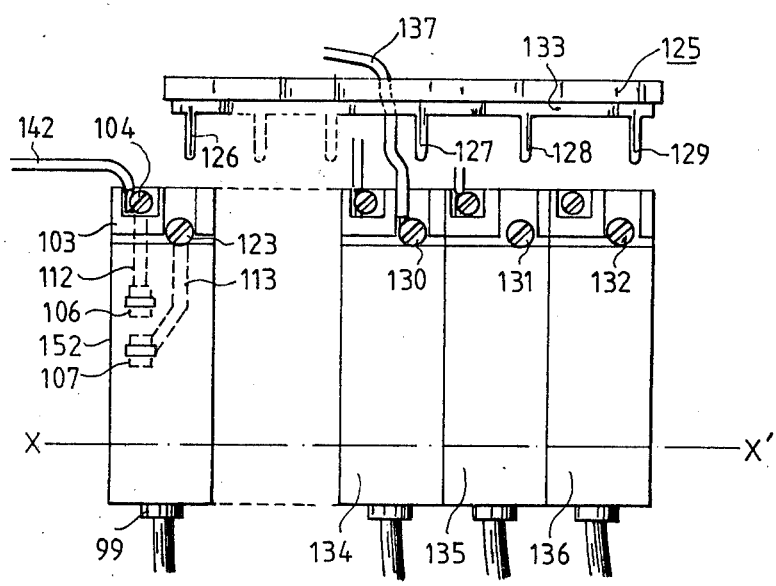
FIG. 10 shows a top view of a system in which the bases are associated using a second method of electrical coupling.

In a variation shown in FIG. 10, in which the parts having the same functions bear the same reference numbers, zone 103 of base 152 comprises a second electrical connection piece 123 which is connected electrically and permanently to the coupling member 107.

This connection is provided by an internal conducting piece 113 comparable with the one previously shown at 112. A base and so an electro-magnetic valve may, in this case, be supplied by means of two fixed conductors terminating in the connection pieces 104 and 123.

This second connection piece 123 which is sufficiently removed and insulated from the first connection piece 104 may be electrically connected to the second corresponding pieces of other bases, for example, by means of connection conductors such as the one shown at 125 in FIG. 10 where it can be seen that parallel metal teeth 126, 127, 128, 129 spaced apart by a distance equal to e, may be electrically associated with second connection pieces 130, 131, 132 belonging to adjacent bases 134, 135, 136.

As in the preceding embodiment, this connecting conductor 125 comprises a conducting part 133 which extends parallel to the longitudinal axis XX', but is electrically connected to a phase conductor, or to a pole of a supply source, by a particular cable 137 associated for example with the second connecting piece 130.

The use of several connecting conductors, such as 125, for supplying certain electric groups of bases, obviously allows one of these groups to be isolated without being obliged to do the same for the others when a conductor such as 137 feeds the permanent potential of the face to one of the pieces 123, 130, 131 or 132.

Figure 11:
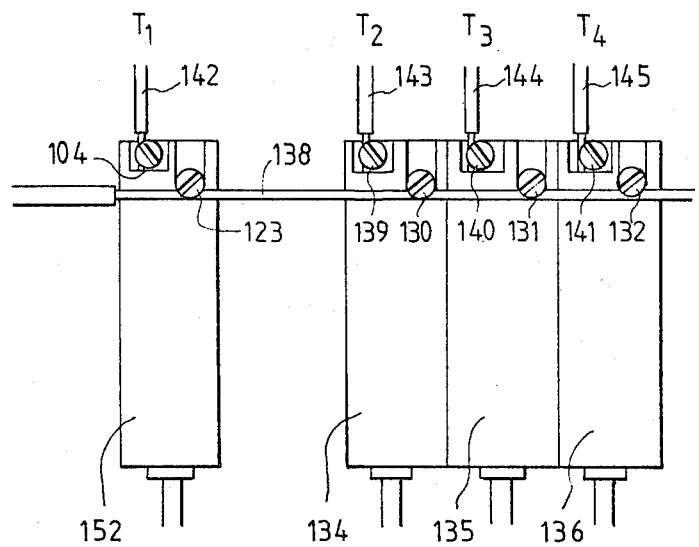
FIGS. 11 and 12 show a top view of a system of associated bases using a third method of electrical coupling.
Figure 12:
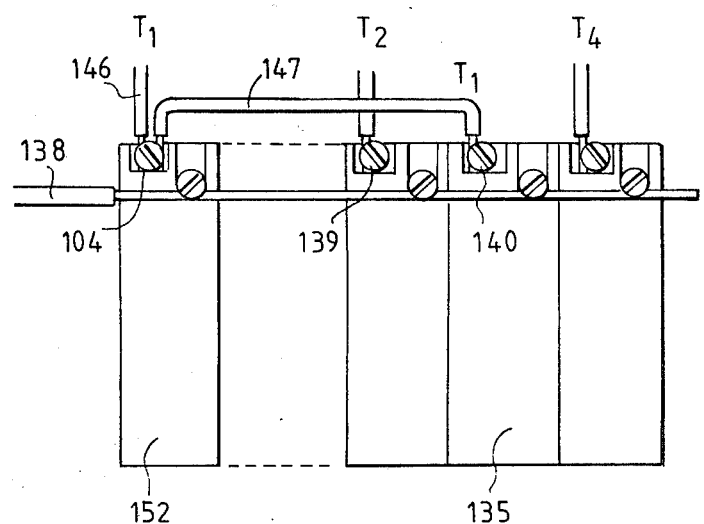

If however, these selective isolating measures for certain bases and electro-magnetic valves are not absolutely necessary, a single electrical conductor may be used, such as is shown in FIGS. 11 and 12, extending parallel to the direction XX', for example a simple cylindrical wire 138 for connecting the whole of the second connecting pieces 123, 130, 131, 132, to one of the poles or one of the phases of a current source.

The first connecting pieces 104, 139, 140, 141 form the inputs of the distribution system which receive, through cables 142, 143, 144, 145, either electric control signals $T_1$, $T_2$, $T_3$, $T_4$, elaborated in the cabinet by appropriate equipment, or possibly electric signals supplied by external detectors or tubes which supply directly signals of an electrical nature, the current return taking place in the cabinet through electrical interconnections established by 138 or 125 or 113 between the second connecting pieces of the bases or between the through conductors.

When the first connecting pieces 104 comprise contact areas, see FIG. 12, which are fairly wide, several conductors 146, 147 may be connected thereto so that two electro-magnetic valves or more associated with two bases 152, 135, or more may be placed in parallel and energized simultaneously in a simple way by means of one and the same signal $T_1$.

When a relatively large number of such modules are coupled together, and especially in the small volume which may be attained with the present device, the individual heating-up of the coils leads to an overall temperature rise which might compromise their life expectancy.

The removal of the heat losses from the electro-magnetic valves may be considerably improved if the fixed metal parts of the electro-magnet, such as the yoke 56, are placed in intimate contact with a metal mass 146 of the body 69 of an electro-magnetic valve 148 in which are provided channels 62, 64,65 and chamber 61, see FIG. 14a; even more efficient heat removal is provided, see FIG. 14b, if the second region 95 of a base 147, which will be placed in intimate contact with surface 67, is also carried by a metal part 149 which is integral with an insulating part 150 of body 153 of the base and which is in direct contact with the metal section 50; in this case, the metal parts 146, 149 may possibly serve for general grounding the electro-magnetic valves.

It is clear that the portions 150, 151 of the respective bodies 87, 69 of base 147 and, respectively, of electro-magnetic valve 148, will always be formed from insulating materials for securing and holding in position different coupling members 106, 107, connecting pieces 104, 123 and terminals 73,74.

Figure 13:
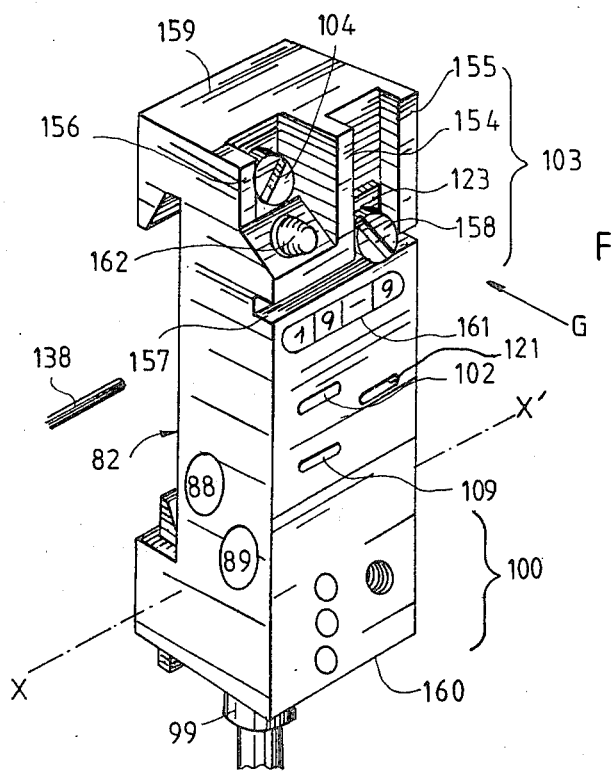
FIG. 13 illustrates a perspective view of an insulated base using the third method of electrical connection.

So as to provide good insulation for the connecting pieces 104, 123, they may be advantageously placed on the base at different levels, see FIG. 13, and be separated by insulating walls 154, 155, 156; a groove such as 157 parallel to the axis XX' may be formed in the insulating body of the base for protecting a common conductor such as 138, and guiding it under the head a clamping screw 158 forming part of the connecting piece 123.

In zones 103 and 100, which are placed at the opposite ends 159, 160 of the base, are situated separate pneumatic and electrical coupling functions, so that the execution of the wiring, of the interconnecting, of coupling and of control is very much simplified.

Zone 103 may also be used to receive an identification mark 161 and possibly a light indicator 162 indicating the presence of voltage or current, using preferably a light emitting diode, visible in the direction G perpendicular to face 82, see FIG. 13. This light emitting diode may be advantageously placed in parallel across a series diode circuit for stabilizing the voltage at the terminals, when different voltages may be used for supplying different electro-magnetic coils.

We claim:

1. An electrically controlled system for distributing pneumatic signals, comprising:
    (A) an elongated support element having a longitudinal axis and two parallel longitudinal flanges,
    (B) a plurality of adjacent base elements each having:
        a securing surface having securing means adapted for longitudinal sliding engagement and fixing on said flanges,
        a first association surface opposite to the securing surface and substantially parallel thereto, said first association surface having a first lateral zone with first, second and third orifices and a second lateral zone opposite to the first lateral zone, said second lateral zone having at least first and second windows,
        first and second opposite coupling surfaces which are parallel with each other and perpendicular to said axis, said first coupling surface comprising first and second openings and said second coupling surface comprising a third window and first and second openings respectively coaxial to the first and second openings of the first coupling surface so that in coupling engagement of two base elements by the respective first and second coupling surfaces thereof, said first and second openings of the coupling surface of one base element are respectively in communication with the first and second openings of a corresponding coupling surface of an adjacent base element,
        first and second electrical female coupling members located in each base element and respectively debouching into said first and second windows, perpendicularly to said first association surface and a third female electrical coupling member located in the base element and debouching into said third window perpendicularly to said second coupling surface,
        first and second opposite end surfaces respectively adjacent to said first and second lateral zones, said first end surface having an aperture provided with a pneumatic connection and said second end surface being provided with an electrical connection device,
        first and second channel portions respectively connecting together said first and second openings of said first and second coupling surfaces through the base element, said first and second channel portions being also respectively connected to the first and second orifices of the first lateral zone,
        a third channel portion connecting the third orifice of the first lateral zone to the aperture of the first end surface,
        electrical conducting means connecting said first electrical coupling member to said electrical connection device through said base element,
        a conducting piece connected to said second electrical coupling member and to said third female coupling member, said conducting piece having a male electrical coupling member projecting beyond said coupling surface parallel to said longitudinal axis and coaxially to said third female member so that in sliding engagement of two adjacent base elements along said longitudinal axis, the male electrical coupling member can penetrate into said female electrical coupling member,
    (C) a plurality of electro-magnetic valves each comprising:
        a body having a second association surface adapted to be adjusted onto said first association surface of one corresponding base element in a coupling arrangement and including an inlet opening, and outlet opening, and exhaust opening and at least first and second electrical connection terminals projecting from said second surface so that in said coupling arrangement, said outlet opening, said exhaust opening and said inlet opening communicate respectively with said first, second and third orifices of said first association surface, and said first and second electrical connection terminals are electrically coupled with said first and second electrical coupling member of said base element,
        a control electro-magnet located in said body and having a coil connected to said first and second electrical connection terminals, a mobile armature having at least first and second positions, valve means including actuation means connected to said armature, a pressure duct connected to said inlet opening, an exhaust duct connected to said exhaust opening, an outlet duct connected to said outlet opening and a valve member controlled by said actuation means for connecting said outlet duct with said pressure duct when said armature is in the first position and for connecting said outlet duct with said exhaust duct when said armature is in said second position.

2. A system as claimed in claim 1, wherein the base comprises a metal mass which comprises the first association surface.

3. A system as claimed in claim 2, wherein said metal mass is in contact with said elongated support element.

4. A system as claimed in claim 1, wherein the coupling members are placed between the first region and the first zone, said second end surface further comprises, an identification label and a control indicator light.

5. A system according to claim 1 wherein the body of said electro-magnetic valve comprises a metal portion having said second association surface, said valve is located in said metal portion and said electro-magnet comprises a yoke in thermal conducting contact with said metal portion.

* * * * *